July 23, 1935. L. M. WOOLSON 2,009,057
INTERNAL COMBUSTION ENGINE
Filed March 28, 1930 2 Sheets-Sheet 1
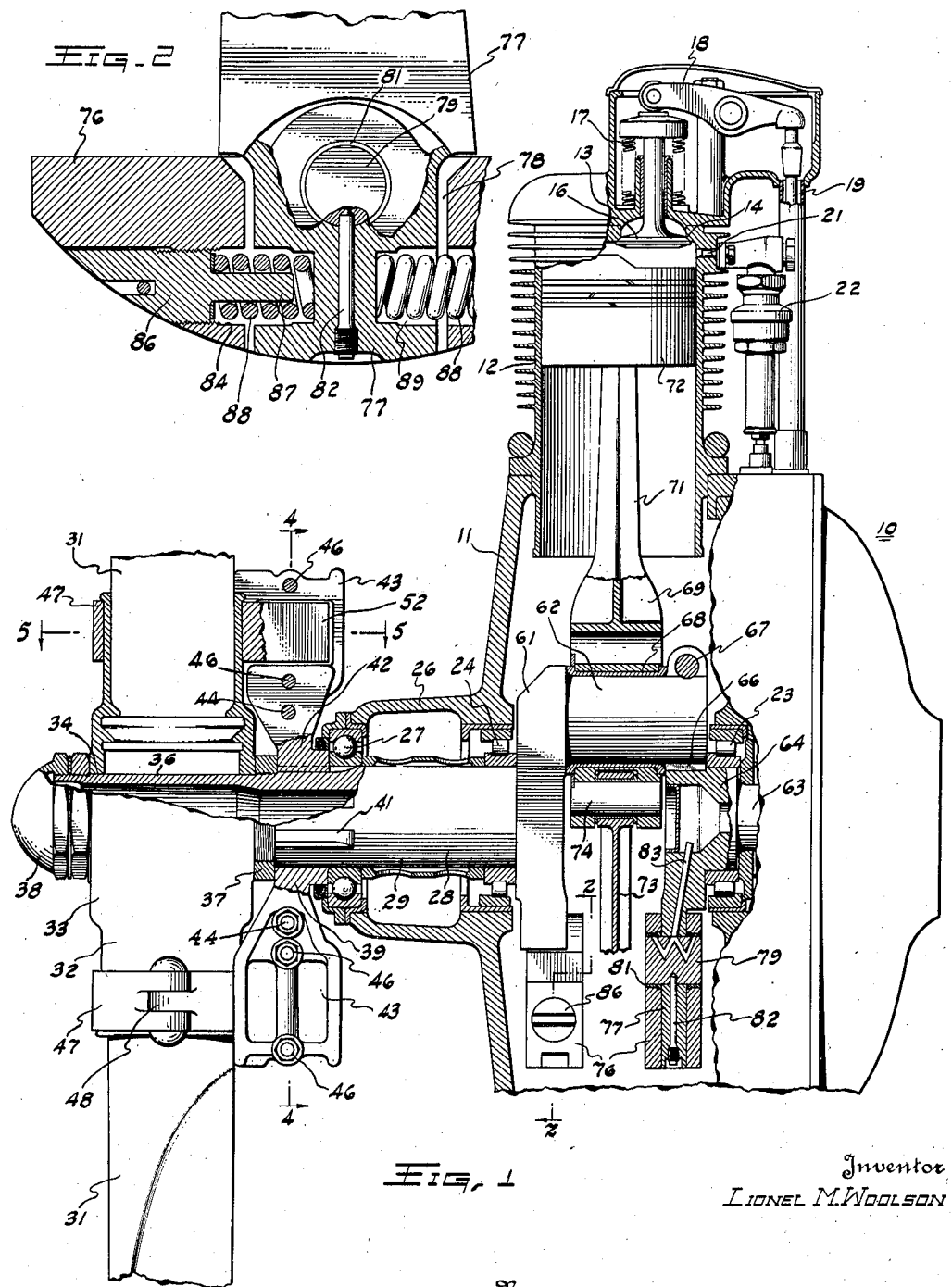
Inventor
LIONEL M. WOOLSON
By Cameron, Kerkam & Sutton
Attorneys July 23, 1935. L. M. WOOLSON 2,009,057
INTERNAL COMBUSTION ENGINE
Filed March 28, 1930 2 Sheets-Sheet 2
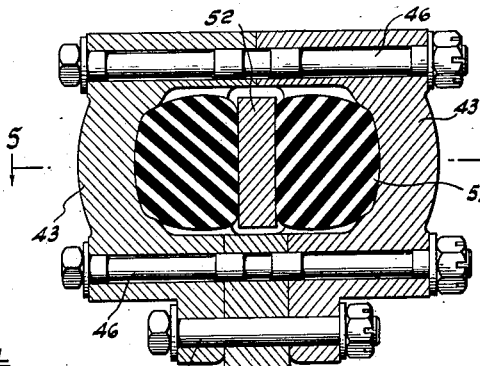
Fig. 4
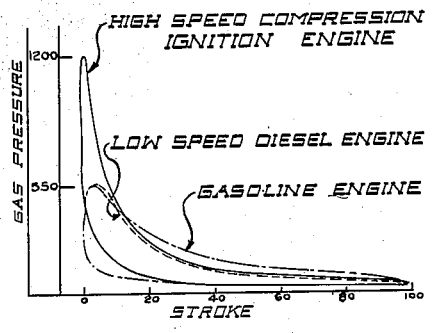
Fig. 6
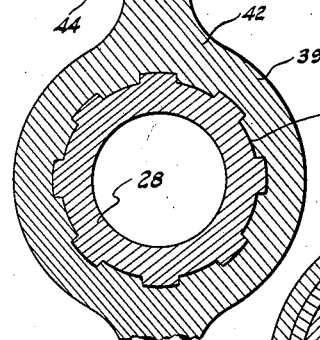
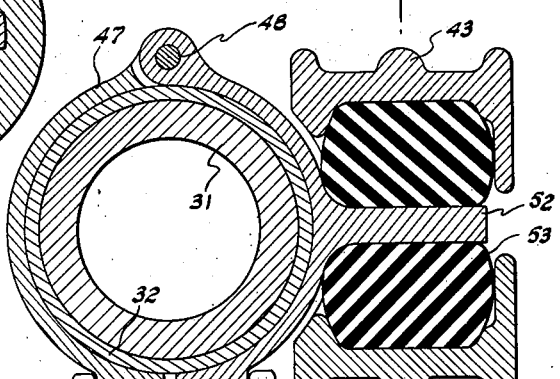
Fig. 5
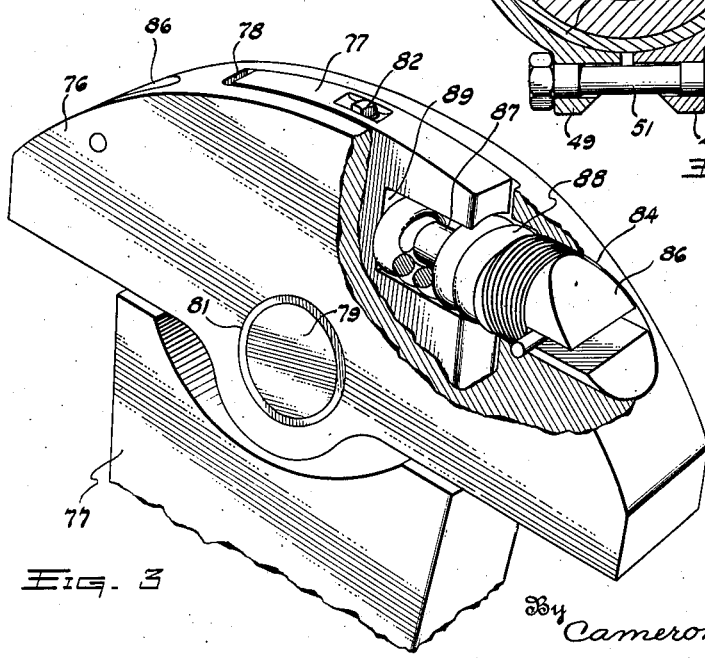
Fig. 3
Inventor
LIONEL M. WOOLSON
By Cameron, Kerkam & Sutton.
Attorneys Patented July 23, 1935

2,009,057

UNITED STATES PATENT OFFICE 2,009,057

INTERNAL COMBUSTION ENGINE

Lionel M. Woolson, Detroit, Mich., assignor to Packard Motor Car Company, Detroit, Mich., a corporation of Michigan Application March 28, 1930, Serial No. 439,800

4 Claims. (Cl. 74—604)

This invention relates to internal combustion engines of the compression ignition type and it is particularly adapted for use with aircraft engines and other high speed engines of this nature arranged to drive loads of considerable inertia, such as aircraft propellers.

The present invention is directly concerned with the development of the Diesel engine for aircraft use. It is a direct result of that development.

For several years gasoline aircraft engines have been built weighing between two and three pounds per H. P., and with the stationary and marine engines of the Diesel type running from twenty-five to four hundred pounds per H. P., it is no wonder that there has existed a general foreboding of extraordinary difficulty in the task of making a Diesel engine sufficiently light for aircraft propulsion purposes.

The high speed Diesel was the answer to this problem—speeds as high as two thousand R. P. M.—and with high speed came early injection of the fuel, as early as fifty degrees before top dead center, and then a higher maximum cylinder pressure was encountered, reaching a value of twelve hundred pounds per square inch or more, as compared with the conventional maximum pressures of about five hundred fifty pounds per square inch obtained in the usual gasoline engines and low speed Diesel engines. True, this very high cylinder pressure was a peak pressure of short duration, occurring at the time of ignition, but it was ten times the average cylinder pressure during the working stroke of the engine, and more than twice the maximum pressure of other comparable engines.

To illustrate this point Fig. 6 of the drawings shows indicator diagrams of a gasoline engine, a low speed Diesel, and a high speed compression ignition, solid fuel injection engine of the type referred to. The twelve hundred pound peak pressure subjects the piston, connecting rod, crank shaft, cylinder, and other parts to terrific shock loads that must be taken and transmitted to the driven member. In the crank shaft these are not only in the form of direct blows delivered through the connecting rods, but also in the form of high instantaneous torsional stresses caused by the high acceleration given to the rotating parts which have large inertia.

Furthermore, these cylinder pressures, or the instantaneous peak torques caused thereby, constitute forced vibrations which synchronize at certain shaft speeds with the natural frequency of the crank shaft, and induce vibrations therein which aggravate the original disturbance. This results in a condition of resonance, and the resonant vibrations, when allowed to build up, grow rapidly and may promptly reach an amplitude such as to result in rupture of the shaft. Nor is this phenomenon always recognized, since vibrations which are inappreciable to the senses may be accompanied by stresses easily sufficient to cause shaft failure.

It is not a sufficient answer to this problem to meet these stresses by increasing the size and strength of the crank shaft and other engine parts, since this necessarily involves a material increase in engine weight, which in aircraft engines is prohibitive. Before compression ignition engines can be made practicable for aircraft use, the crank shaft and associated parts must be of a size and weight favorably comparable with the corresponding parts of existing aircraft engines of similar power, and the overstressing of these shafts from the forces to which they are subjected must be prevented in some other way.

The present applicant has discovered that such overstressing and failure of the crank shafts of compression ignition engines of this type is due to a combination of the stresses resulting from peak cylinder pressures and resonant vibrations, and that a remedy for this difficulty is not effected either by simple damping of the induced vibrations, or by cushioning the directly applied shocks, but that both damping and cushioning, jointly applied, do produce the desired effect on the shaft, with the result that the shaft, and with it the connecting rods and other parts of the engine, may be greatly reduced in size and weight without fear of failure under maximum loads.

The present invention, therefore, has for its principal object to provide a method of cushioning or relieving stresses and damping torsional disturbance in the crank shafts of such engines. It provides a method whereby the overstressing and breakage of engine crank shafts may be overcome and the necessity for using shafts of excessive strength and weight avoided. It contemplates the introduction into the shaft system of sufficient resilience to effectively cushion the direct shock loads, and thus to transfer the critical speeds of the shaft to a lower position in the engine speed range, while at the same time damping such induced disturbance as may appear, to prevent the resonant growth thereof. The invention has been described as applied to an aircraft engine of the radial type arranged to drive an aircraft propeller, but it will be understood that the method thereof may be practiced in connection with other embodiments.

The objects and features of novelty of the invention will be apparent from the description taken in connection with the drawings, in which:

Fig. 1 is a longitudinal section through a portion of a compression ignition engine arranged to drive an aircraft propeller, showing a construction suitable for effecting the method of this invention;

Fig. 2 is an enlarged section taken substantially on the line 2—2 of Fig. 1;

Fig. 3 is an enlarged perspective view, partially broken away, of a counterweight such as shown in Fig. 1 but in a different position, illustrating a form of damping and cushioning device suitable for the practice of this invention;

Fig. 4 is an enlarged detail section taken substantially on the lines 4—4 of Figs. 1 and 5;

Fig. 5 is an enlarged detail section taken substantially on the lines 5—5 of Figs. 1 and 4, and Fig. 6 is a comparison of characteristic indicator diagrams of a gasoline aircraft engine, a low speed Diesel engine, and a high speed compression ignition solid fuel injection engine of the type to which this invention relates.

Referring to the drawings, at 10 is shown an aircraft engine of the well-known radial type having a crank case 11 on which are mounted a number of radially disposed cylinders, one of which is shown at 12. Each of the cylinders 12 is provided with an integral head 13 having an air inlet and exhaust port 14, controlled by a valve 16 and adapted to be opened in timed relation to the engine against valve springs 17 by suitable valve operating mechanism, such as a rocker arm 18 and a push rod 19, which may be driven from the engine crank shaft or other moving engine part in the usual way. A fuel nozzle 21 communicates with the interior of each of the cylinders and with a suitable fuel pump 22 which is also driven from the engine in timed relation thereto, there being a pump 22 for each of the engine cylinders. This pump 22 operates to inject a measured charge of liquid fuel into the cylinder at the proper time in the cycle thereof, as is well understood in the art to which this invention relates.

The crank shaft system of this invention comprises the engine crank shaft and the elements associated therewith including the propeller or other load with its hub or mounting and shaft connection, the crank, the connecting and link rods and their hub, and the counterweights or balancing masses.

In the embodiment illustrated, the crank shaft 28 is of the built-up type having a forwardly extending portion 29 journaled in the bearings 24 and 27. This forward or driving portion of the crank shaft supports the engine load which in the present embodiment comprises an aircraft propeller having a pair of oppositely disposed blades 31 secured in sockets 32 on a propeller hub 33, the blades 31 being mounted therein in any suitable manner, not shown in the drawings. The hub is provided with a transverse bore 34, journaled on a hollow extension 36 of the crank shaft 28, and is axially positioned thereon between a ring 37, threaded or otherwise suitably secured to the crank shaft 28, and a retaining member 38 such as a suitable nut, threaded on the end of the extension 36. The drive between the crank shaft and the propeller is effected by resilient driving means between the hub 33 and the end of the crank shaft 28. As shown this comprises a driving hub 39, splined or otherwise rigidly connected to the end of the crank shaft 28 as indicated at 41 in Figs. 1 and 4, and positioned axially of the shaft between the ring 37 and the inner race ring of the shaft bearing 27. This hub is provided with oppositely disposed driving arms 42, to each of which is secured the halves of a two-part housing member 43, these parts being clamped together and to the arm 42 by suitable means such as bolts 44. The halves of the housing 43 are also rigidly clamped together by bolts 46 on either side thereof. Each of the propeller blade sockets 32 is embraced by a removable clamp band 47 formed in two parts, which are hinged together as at 48. The free ends of these parts are provided with lugs 49 which are adapted to be drawn together by a bolt 51 to clamp the band tightly on the socket 32. Integral with the band 47 is a driving lug 52 positioned to project into the housing 43 between the halves thereof. On either side of this lug 52 within the housing, is a yieldable cushioning member 53 of any suitable resilient material, preferably rubber, which may be somewhat compressed between the housing portions 43. The crank shaft torque is transmitted from the driving hub 39 and its arms 42 to the housing 43, and thence through the resilient cushion members 53 to the driving lugs 52 of the clamp 47 on the propeller blade socket. As the propeller hub is thus journaled on the extension 36 of the crank shaft, it will be seen that this construction provides a propeller drive which is somewhat flexible, permitting the propeller hub to lag behind the crank shaft during periods of peak torque therein, while the rubber members 53 are compressed, and subsequently to advance to its normal position with respect to the shaft as the rubber members expand. Hence the connection is adapted to yield to the high shock torque so that the inertia stresses of accelerating the propeller are not imposed instantaneously on the shaft.

The crank shaft 28 also comprises an integral crank arm 61 with a crank pin 62 thereon. An aligned portion 63, journaled in a bearing 23, is provided with an integral crank arm 64, secured to the crank pin 62 in any suitable manner as by a key 66 and a clamp bolt 67, the arms 61 and 64 and the pin 62 forming the crank of the shaft 28. Journaled on the crank pin 62 through a suitable bushing 68 is the hub portion 69 of a master connecting rod 71, the other end of which is connected to a piston 72 in one of the engine cylinders 12. Similar pistons (not shown) in the other cylinders of the engine are connected by means of link rods such as 73 to link pins such as 74, pivotally mounted in the hub portion 69 and arranged in circular spaced relation therein around the crank pin 62 in the well-known manner, so that the pressures of all the pistons 72 are communicated to and drive the crank shaft 28.

The unbalanced rotating masses of the crank shaft system, which include the crank, the master rod and its hub, and the link rods and associated parts, are adapted to be counterbalanced by suitable counterweights, which as best shown in Figs. 2 and 3 comprise segmental weight members or masses 76, one of which is mounted opposite each crank arm on an integral extension 77 thereof. Each of the extensions 77 projects through a slot 78 formed in the median plane of the weight member, and said member is pivotally secured thereto by a pivot pin 79, mounted in the extension and on which the member is journaled as by bushings 81. The pins 79 may be secured to the extensions 77 by any convenient means such as a locking pin 82, and they may be lubricated through conduits 83 which communicate with the engine lubricating system (not shown).

The counterweights 76 are necessary to bring the large off-center masses into static balance about the crank shaft axis, but it will be evident that their mass is responsible for a large part of the inertia of the crank shaft system which must be overcome in accelerating the crank shaft, and that the high acceleration given to these masses by piston thrust at the high pressure moment of ignition would cause tremendous stress in the crank shaft. According to the present invention these members are resiliently connected to the crank arm extensions so that they may yield somewhat and thereby cushion the piston thrust and the resulting applied torque and hence materially lower attendant stresses. To this end each of the weights is provided with longitudinally aligned bores 84 which extend from its arcuate face into communication with the slot 78 at right angles thereto. The outer ends of these bores are closed by threaded plugs 86 having inwardly disposed guide extensions 87, which serve as abutments for stiff opposed compression springs 88. The inner ends of the springs 88 are seated in recesses 89 formed in the crank arm extension 77, and they bear with equal and opposite force on this extension so that it will be evident that the counterweight is being continually urged towards its normal or neutral position with respect to the crank arm. Under the sudden impact caused by the explosion pressures in the engine cylinders, one of the springs 88 will yield to permit each of the counterweights to move slightly on its pivot pin 79. Because of this construction, a large portion of the mass of the shaft assembly is coupled to the shaft through resilient means which yields under the sudden torque at the time of ignition absorbing or storing a part of the energy and permitting the inertia to be overcome more gradually and the mass less suddenly accelerated. Evidently such elastic cushioning of the shock forces applied to the crank shaft greatly reduces the stresses that would otherwise occur in that member. After the moment of peak pressure has passed, a part of the energy which was absorbed or stored in compressing the springs 88 is returned to the crank shaft system through the reaction of the springs which at the same time restores the counterweight to its neutral position with respect to the arm 77.

It will be evident that this invention provides for the introduction into the crank shaft system of considerable resilience, represented in the particular embodiment described by the springs 88 and the rubber driving members 53. This resilience permits the counterweights and the propeller, which represent a large portion of the mass of the system, to lag behind the crank shaft at their moments of peak torque, so that the acceleration thereof is slower, thus greatly reducing the inertia stresses which would otherwise be imposed upon the shaft. At the same time such increase in the resilience of the system, as in any other vibratory system, lowers the positions in the engine speed range at which resonant vibrations occur.

To prevent the resonant growth of such vibrations as may be induced in the crank shaft system by the forced vibration, the present invention proposes to provide adequate damping during the entire period of disturbance. In the embodiment illustrated, such damping is effected by mechanical friction in the pivotal mounting of the counterweights 76 and by internal friction or hysteresis in the resilient driving members 53, which mechanical and internal friction serves to dissipate vibratory energy at a rate sufficient to prevent its growth through resonance. The damping friction at the counterweight mounting occurs principally between the pin 79 and its cooperating bearings, these being subjected to high pressures because of the centrifugal force acting on the weights, and to this friction may be added that produced by the crank arm extension 77 being a close fit in the slot 78 so that the side faces of the extension are in rubbing contact with the side walls of the slot. The hysteresis damping in the members 53 occurs by reason of the energy lost or converted into heat in putting the rubber through a cycle of compression and expansion. If desired, it may be controlled to some extent by adjusting the initial compression of these members between the housing parts 43.

It will be noted that the damping effect will continue as long as there is any relative movement between the counterweights and the arm extensions and between the propeller hub and the crank shaft, such damping extending through both the period in which energy is stored in the resilient members and the period of energy return.

The invention, therefore, provides a method of preventing the overstressing or failure of the shafts of engines of this type and it permits the use of a lightweight shaft adapted to safely carry the working stresses with a proper factor of safety.

Although the invention has been specifically described, the principles involved are susceptible of numerous applications which will readily occur to persons skilled in the art. The invention is therefore to be limited only as indicated by the scope of the appended claims.

Having thus described the invention, what is claimed and desired to be secured by Letters Patent is:

1. In apparatus for preventing disruptive overstresses in the crank shaft system of a compression ignition engine arranged to drive a load of considerable inertia and having shock loads at the moment of ignition which cause a period of high stress, the combination with the crankshaft and the load, of vibration damping means associated directly with the crankshaft for resiliently absorbing a part of the torque applied to the shaft during said period of stress and returning part of said absorbed torque subsequently to said period, and a second vibration damping means acting between said crankshaft and said load to resiliently absorb a part of the torque transmitted through said shaft during said period of stress and subsequently returning a part of the torque thus absorbed, said vibration damping means both serving to continuously damp torsional disturbances induced in the shaft during the time of torque absorption and return and each said means being capable of acting as a vibration damper independently of the other.

2. The combination recited in claim 1 in which the vibration damping means associated directly with said crankshaft comprises an inertia member supported for vibratory movement with respect to the shaft in response to torsional disturbances induced in the shaft, and resilient means for coupling the inertia member and the shaft to resist such vibratory disturbances.

3. The combination recited in claim 1 in which the vibration damping means associated directly with said crankshaft comprises an inertia member supported for vibratory movement with respect to the shaft in response to torsional disturbances induced in the shaft, and a resilient, friction developing connection between the shaft and inertia member for resisting such vibratory movement of the latter.

4. The combination recited in claim 1 in which the vibration damping means associated directly with said crankshaft comprises an inertia member supported for vibratory movement with respect to the shaft in response to torsional disturbances induced in the shaft, and a resilient, friction developing connection between the shaft and inertia member for resisting such vibratory movement of the latter, said vibration damping means acting between said crankshaft and said load including a resilient, friction developing connection therebetween.

LIONEL M. WOOLSON.